United States Patent
Koyata et al.

(10) Patent No.: US 8,094,690 B2
(45) Date of Patent: Jan. 10, 2012

(54) WAVELENGTH CONVERTING ELEMENT AND WAVELENGTH CONVERTING LASER APPARATUS

(75) Inventors: Yasuharu Koyata, Tokyo (JP); Takayuki Yanagisawa, Tokyo (JP); Shuhei Yamamoto, Tokyo (JP); Yoshihito Hirano, Tokyo (JP); Tsutomu Nagatsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/677,827

(22) PCT Filed: Sep. 12, 2007

(86) PCT No.: PCT/JP2007/067737
§ 371 (c)(1),
(2), (4) Date: Mar. 12, 2010

(87) PCT Pub. No.: WO2009/034625
PCT Pub. Date: Mar. 19, 2009

(65) Prior Publication Data
US 2010/0303108 A1 Dec. 2, 2010

(51) Int. Cl.
*H01S 3/10* (2006.01)
(52) U.S. Cl. .......................... 372/21; 372/22
(58) Field of Classification Search ............ 372/21, 372/22
See application file for complete search history.

(56) References Cited

U.S. PATENT DOCUMENTS

| 5,546,220 A | 8/1996 | Endo et al. |
| 2003/0084837 A1 | 5/2003 | Lee et al. |
| 2004/0233511 A1 * | 11/2004 | Kurz et al. ............ 359/326 |
| 2007/0297033 A1 * | 12/2007 | Kelley ................... 359/33 |
| 2008/0095202 A1 | 4/2008 | Yanagisawa et al. |

FOREIGN PATENT DOCUMENTS

| JP | 5 249518 | 9/1993 |
| JP | 7 106682 | 4/1995 |
| JP | 7 225403 | 8/1995 |
| JP | 7 311395 | 11/1995 |
| JP | 11 337990 | 12/1999 |
| JP | 2000 171844 | 6/2000 |
| JP | 2000 321610 | 11/2000 |

(Continued)

OTHER PUBLICATIONS

U.S. Appl. No. 12/669,966, filed Jan. 21, 2010, Yanagisawa, et al.

(Continued)

*Primary Examiner* — Armando Rodriguez
(74) *Attorney, Agent, or Firm* — Oblon, Spivak, McClelland, Maier & Neustadt, L.L.P.

(57) ABSTRACT

A wavelength converting element that is of a planar waveguide type, includes a plate-like nonlinear optical material, and performs a wavelength conversion on a fundamental wave of a laser beam by propagating the fundamental wave in a plurality of laser oscillation modes in a direction perpendicular to a main surface of the plate-like nonlinear optical material, the direction being perpendicular to an optical axis, wherein periods of polarization inversions of the nonlinear optical material are changed so that each of the periods has a width of a phase matching band A that includes phase matching conditions of at least two of the plurality of laser oscillation modes and so that a non-polarization-inversion region and a polarization inversion region are formed in the nonlinear optical material.

7 Claims, 8 Drawing Sheets

FOREIGN PATENT DOCUMENTS

| | | |
|---|---|---|
| JP | 2003 186069 | 7/2003 |
| JP | 2005 352393 | 12/2005 |
| JP | 2006 66817 | 3/2006 |
| JP | 2006-100772 | 4/2006 |
| JP | 2006 330661 | 12/2006 |
| JP | 2007-73552 | 3/2007 |
| JP | 2007 79227 | 3/2007 |
| WO | WO 2005/033791 A1 | 4/2005 |

OTHER PUBLICATIONS

U.S. Appl. No. 12/675,447, filed Feb. 26, 2010, Yamamoto, et al.
U.S. Appl. No. 12/671,458, filed Jan. 29, 2010, Yanagisawa, et al.
U.S. Appl. No. 12/675,125, filed Feb. 25, 2010, Yamamoto, et al.
Office Action issued in Japanese Application No. 2009-532006 on Nov. 22, 2011.

* cited by examiner

FUNDAMENTAL WAVE WAVELENGTH [nm]

FIG.12

FUNDAMENTAL WAVE WAVELENGTH [nm]

WAVELENGTH CONVERTING ELEMENT AND WAVELENGTH CONVERTING LASER APPARATUS

TECHNICAL FIELD

The present invention relates to a wavelength converting element and a wavelength converting laser apparatus that each perform a wavelength conversion of a laser beam on the inside of a planar waveguide.

BACKGROUND ART

As the light sources for an apparatus that displays color images, e.g., a printer or a projection television, light sources corresponding to three colors that are namely Red (R), Green (G), and Blue (B) are required. In recent years, as these light sources, wavelength converting laser apparatuses (laser oscillators) have been developed in which laser beams in a 900 nanometer band, a 1 micrometer band, and a 1.3 micrometer band are used as fundamental wave laser beams so that, by using a nonlinear material, the fundamental wave laser beams are converted into second harmonic waves each having half the wavelength (twice the frequency) through a Second Harmonic Generation (SHG).

To efficiently extract the laser beams having the desired wavelengths during the SHG, it is necessary to realize a high level of efficiency in the conversion from the fundamental wave laser beams to the second harmonic laser beams. To convert the fundamental wave laser beams into the second harmonic laser beams within a wavelength converting element, phase matching conditions need to be satisfied between the fundamental wave laser beams before the conversion and the second harmonic waves after the conversion. The phase matching conditions are conditions under which phase shifting between the fundamental wave laser beams and the second harmonic laser beams is corrected by the wavelength converting element. As an example of elements that are capable of converting wavelengths while satisfying such phase matching conditions, Quasi Phase Matching (QPM) elements in which a periodic structure is used are known. In a QPM wavelength converting element, an optical waveguide is formed in, for example, Periodically Poled Lithium Niobate (PPLN), which is a nonlinear optical crystal, so that polarization is periodically inverted along the waveguide direction.

Such a QPM wavelength converting element, however, has a small tolerance (a phase matching bandwidth) for the phase matching conditions with respect to the wavelengths of the fundamental waves and the temperature of the wavelength converting element. To cope with this situation, a QPM wavelength converting element having a structure in which the pitch of the polarization inversion periods is gradually changed (a structure in which the periodic structure of the polarization inversions is changed in a chirp-like manner) has been proposed, as a means for broadening the phase matching bandwidth.

An optical wavelength converting element described in Patent Document 1 has a periodical polarization inversion structure that is formed in a nonlinear optical crystal, the polarization inversion structure including a portion having a single period (a single period portion) and a chirp period portion in which the period gradually changes.

Patent Document 1: Japanese Patent Application Laid-open No. 2000-321610

DISCLOSURE OF INVENTION

Problem to be Solved by the Invention

According to the conventional technique described above, however, when a fundamental wave oscillates in a high-order laser oscillation mode (a high-order mode) in the waveguide, the phase matching conditions are not satisfied with respect to the fundamental wave in the high-order mode. Thus, it is not possible to efficiently perform the wavelength conversion on the fundamental wave in the high-order mode. As a result, a problem remains where the wavelength conversion efficiency for a plurality of laser oscillation modes is low. In addition, it is necessary to configure the wavelength converting element so as to be thin to inhibit generation of high-order mode fundamental waves. Thus, another problem remains because it is difficult to configure wavelength converting elements so as to be thin.

In view of the problems described above, it is an object of the present invention to provide a wavelength converting element and a wavelength converting laser apparatus that each efficiently perform a wavelength conversion on fundamental wave wavelengths, by using a simple configuration.

Means for Solving Problem

In order to solve the above mentioned problem and achieve the object, in the present invention, a wavelength converting element that is of a planar waveguide type, includes a plate-like nonlinear optical material, and performs a wavelength conversion on a fundamental wave of a laser beam by propagating the fundamental wave in a plurality of laser oscillation modes in a direction perpendicular to a main surface of the plate-like nonlinear optical material, the direction being perpendicular to an optical axis, wherein periods of polarization inversions of the nonlinear optical material are changed so that each of the periods has a phase matching bandwidth that includes phase matching conditions of at least two of the plurality of laser oscillation modes and so that a non-polarization-inversion region and a polarization inversion region are formed in the nonlinear optical material.

Effect of the Invention

The wavelength converting element according to the present invention is configured in such a manner that the periods of the polarization inversions of the nonlinear optical material are changed so that each of the periods has a phase matching bandwidth that includes the phase matching conditions of at least two laser oscillation modes. Thus, an advantageous effect is achieved where it is possible to efficiently perform the wavelength conversion on the fundamental wave wavelengths, by using the simple configuration.

EXPLANATIONS OF LETTERS OR NUMERALS 1 nonlinear optical material
2, 3, 22, 23 clad
4 polarization inversion layer
6 optical axis
10 wavelength converting element
11a, 11b, 25a, 25b end face
20 solid laser element
21 laser medium
30 semiconductor laser
100 wavelength converting laser apparatus
A phase matching band
L harmonic laser beam

BEST MODE(S) FOR CARRYING OUT THE INVENTION

Exemplary embodiments of a wavelength converting element and a wavelength converting laser apparatus according to the present invention will be explained in detail, with reference to the accompanying drawings. The present invention is not limited to the exemplary embodiments.

Embodiments

Figure 1:
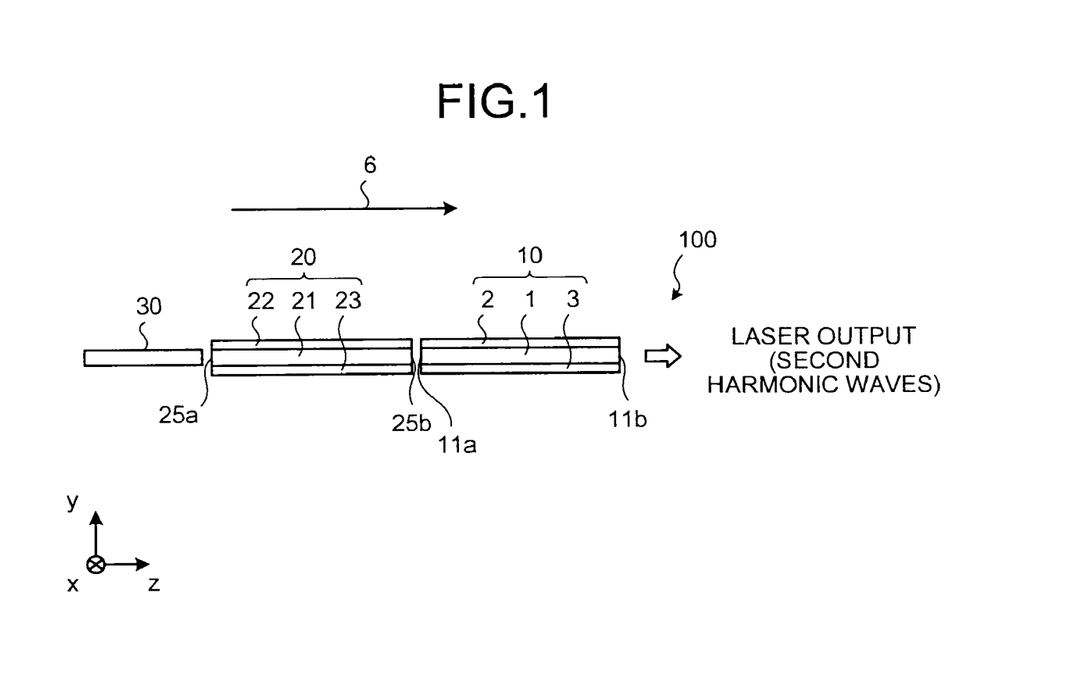
FIG. 1 is a cross-sectional view viewed from a lateral direction of a wavelength converting laser apparatus according to an embodiment of the present invention.
Figure 2:
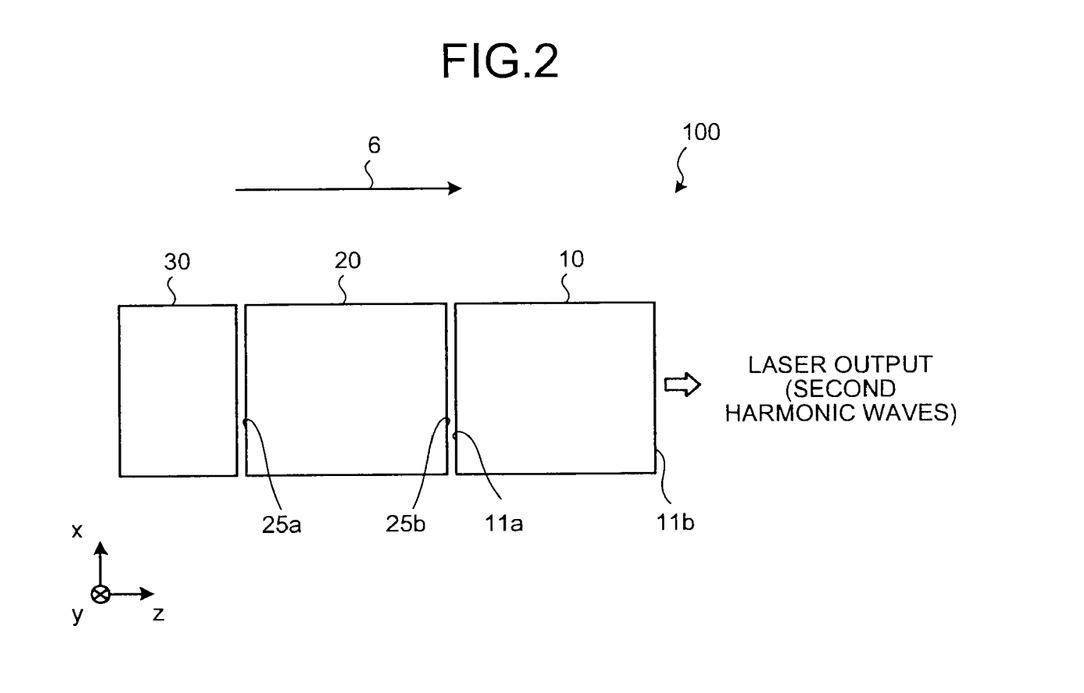
FIG. 2 is a top view illustrating a configuration of the wavelength converting laser apparatus according to the embodiment of the present invention.

FIG. 1 is a cross-sectional view viewed from a lateral direction of a wavelength converting laser apparatus according to an embodiment of the present invention. FIG. 2 is a top view illustrating a configuration of the wavelength converting laser apparatus according to the embodiment of the present invention. In FIGS. 1 and 2, an optical axis indicating a laser oscillation direction is shown as an optical axis 6.

A wavelength converting laser apparatus 100, which is of a planar waveguide type, is a laser oscillator that is configured in such a manner that, for example, the pitch of polarization inversion periods is gradually changed so that it is possible to perform a wavelength conversion on a fundamental wave that oscillates in a plurality of laser oscillation modes (e.g., a zeroth-order mode and a first-order mode). For example, the wavelength converting laser apparatus 100 is used as a light source for a laser display apparatus or an optical memory apparatus in the field of optical information processing.

The wavelength converting laser apparatus 100 is configured so as to include a semiconductor laser 30, a solid laser element 20, and a wavelength converting element (a waveguide-type wavelength converting element) 10, which forms one of the main characteristics of the present invention.

The semiconductor laser 30 outputs one or more Laser Diode (LD) beams from one or more active layers. In the case where a plurality of LD beams are output, the semiconductor laser 30 emits the LD beams in an array configuration so as to cause the solid laser element 20 to perform a multi-emitter oscillation. The solid laser element 20 is an element that oscillates fundamental wave laser beams and includes a laser medium 21 as well as clads (low refractive index portions) 22 and 23. The wavelength converting element 10 is an element that converts the oscillating fundamental wave laser beams into second harmonic laser beams and emits the second harmonic laser beams resulting from the conversion. The wavelength converting element 10 has a slab-type waveguide structure and includes a nonlinear optical material 1 as well as clads 2 and 3.

In the following sections, for the sake of convenience of explanation, the optical axis 6 will be referred to as a z-axis direction, whereas a direction that is perpendicular to a main surface of the wavelength converting laser apparatus 100 will be referred to as a y-axis direction, while a direction (the width direction of the wavelength converting element 10 and the like) that is perpendicular to both the y-axis and the z-axis will be referred to as an x-axis direction.

The semiconductor laser 30, the laser medium 21, and the nonlinear optical material 1 each have a substantially-rectangular plate-like shape and are provided in such a manner that the plate-like main surfaces thereof each extend parallel to the x-z plane (while being arranged in a row on one plane). The laser medium 21 is provided between the semiconductor laser 30 and the nonlinear optical material 1 in such a manner that a lateral face thereof (an end face 25a that extends perpendicular to the z-axis) is positioned close to the semiconductor laser 30, while another lateral face thereof (an end face 25b that extends perpendicular to the z-axis) being opposite that lateral face is positioned close to the nonlinear optical material 1. The nonlinear optical material 1 has an end face 11a and another end face 11b that each extend perpendicular to the optical axis 6 and is provided in such a manner that the end face 11a is positioned close to the end face 25b of the laser medium 21. The end face 11b of the nonlinear optical material 1 is an end face positioned on the side from which a second harmonic laser beam L is emitted.

Vicinal planes of the semiconductor laser 30 and the laser medium 21 with which the semiconductor laser 30 and the laser medium 21 are positioned close to each other have substantially the same planar shape as each other (substantially rectangular shapes). Also, vicinal planes of the laser medium 21 and the nonlinear optical material 1 with which the laser medium 21 and the nonlinear optical material 1 are positioned close to each other have substantially the same planar shape as each other (substantially rectangular shapes).

In other words, in the wavelength converting laser apparatus 100, the semiconductor laser 30, the solid laser element 20, and the wavelength converting element 10 are provided so that the emitting face of the semiconductor laser 30, the end faces 25a and 25b of the laser medium 21, and the end faces 11a and 11b of the nonlinear optical material 1 extend parallel to one another. It is also acceptable to attach a heat sink (not shown) for cooling purposes to the semiconductor laser 30, as necessary. The width of the semiconductor laser 30 in the x-axis direction is substantially equal to the width of the laser medium 21 in the x-axis direction. The semiconductor laser 30 outputs excitation light beams in the x-axis direction in a substantially uniform manner. The semiconductor laser 30 may be configured with, for example, a multi-emitter semiconductor laser in which a plurality of active layers that output LD beams are provided. In the case where the semiconductor laser 30 is a multi-emitter semiconductor laser, the semiconductor laser 30 is configured so that the active layers are disposed in such a manner that the active layers are arranged in a row in the x-axis direction of the laser beam emitting face. In this situation, because the semiconductor laser 30 is configured so that the plurality of LD beams are output from the plurality of active layers, the solid laser element 20 is able to obtain the laser output beams from the active layers, respectively, that are arranged in a row in the x-axis direction. The LD beams that have been output from the semiconductor laser 30 become incident in the x-z plane direction of the laser medium 21 (in the direction of the optical axis 6 that is perpendicular to the x-y plane) through the end face 25a and are absorbed by the laser medium 21.

The end face 25a of the laser medium 21 is a total reflection film that reflects the fundamental wave laser beams. The end face 25b of the laser medium 21 is an antireflection film that is transmissive of the fundamental wave laser beams. The end face 11a of the nonlinear optical material 1 is an optical film (a partial reflection film) that is transmissive of the fundamental wave laser beams and reflects the second harmonic laser beams L. The end face 11b of the nonlinear optical material 1 is an optical film (a partial reflection film) that reflects the fundamental wave laser beams and is transmissive of the second harmonic laser beams L. These total reflection film, antireflection film, and optical films are each manufactured by, for example, laminating dielectric thin films. In the case where the excitation light beams that have been output from the semiconductor laser 30 become incident through the end face 25a of the laser medium 21, the total reflection film on the end face 25a is an optical film that is transmissive of the excitation light beams and reflects the fundamental wave laser beams.

The laser medium 21 is sized so that, for example, the thickness thereof in the y-axis direction is some micrometers to tens of micrometers, whereas the width thereof in the x-axis direction is hundreds of micrometers to some millimeters. A commonly-used solid laser material may be used as the laser medium 21. The laser medium 21 is configured with, for example, Nd:YAG, Nd:YLF, Nd:Glass, Nd:YVO4, Nd:GdVO4, Yb:YAG, Yb:YLF, Yb:KGW, Yb:KYW, Er:Glass, Er:YAG, Tm:YAG, Tm:YLF, Ho:YAG, Ho:YLF, Tm, Ho:YAG, Tm, Ho:YLF, Ti:Sapphire, or Cr:LiSAF.

Each of the clads 22 and 23 has a smaller refractive index than the laser medium 21. The clads 22 and 23 are joined with main surfaces of the laser medium 21 by the surfaces thereof (an upper face of the clad 23 and a lower face of the clad 22) that extend parallel to the x-z plane of the laser medium 21. For example, the clads 22 and 23 are manufactured by using a method by which films made of an optical material are deposited on the laser medium 21 or by using a method by which an optical material is optically joined with the laser medium 21 through an optical contact process or a diffusion bonding process. It is also acceptable to attach a heat sink (not shown) for cooling purposes on the lower face side of the clad 23.

The nonlinear optical material 1 performs a wavelength conversion on the fundamental wave laser beams that become incident from the laser medium 21 side and outputs the second harmonic laser beams L. The nonlinear optical material 1 is sized so that, for example, the thickness thereof in the y-axis direction is some micrometers to tens of micrometers, whereas the width thereof in the x-axis direction is hundreds of micrometers to some millimeters. A commonly-used wavelength converting material may be used as the nonlinear optical material 1. The nonlinear optical material 1 is configured with, for example, KTP, KN, BBO, LBO, CLBO, LiNbO3, or LiTaO3. Also, in the case where MgO-doped LiNbO3, MgO-doped LiTaO3, stoichiometric LiNbO3, or stoichiometric LiTaO3 each of which is highly resistant to optical damages is used as the nonlinear optical material 1, it is possible to increase the power density of the fundamental wave laser beams that become incident thereto. As a result, it is possible to perform the wavelength conversion with high efficiency. Further, in the case where MgO-doped LiNbO3, MgO-doped LiTaO3, stoichiometric LiNbO3, stoichiometric LiTaO3, or KTP each of which has a periodically-inverted polarization structure is used as the nonlinear optical material 1, because the nonlinear constant is large, it is possible to perform the wavelength conversion with even higher efficiency than when MgO-doped LiNbO3 is used.

Each of the clads 2 and 3 has a smaller refractive index than the nonlinear optical material 1. The clads 2 and 3 are joined with main surfaces of the nonlinear optical material 1 by the surfaces thereof (an upper face of the clad 3 and a lower face of the clad 2) that extend parallel to the x-z plane of the nonlinear optical material 1. For example, the clads 2 and 3 are manufactured by using a method by which films made of an optical material are deposited on the nonlinear optical material 1 or by using a method by which an optical material is optically joined with the nonlinear optical material 1 through an optical contact process or a diffusion bonding process.

According to the present embodiment, to realize a high level of efficiency in the conversion from the fundamental wave laser beams to the second harmonic laser beams, a Quasi Phase Matching (QPM) wavelength converting element is used as the wavelength converting element 10. The wavelength converting element 10 is configured in such a manner that the periods of the polarization inversions are changed in a chirp-like manner (the periodic structure of the polarization inversions is modulated) so that, in the case where the fundamental waves oscillate in a high-order laser oscillation mode (a high-order mode) in the waveguide, it is possible to perform a wavelength conversion on the fundamental waves in the high-order mode. For example, the wavelength converting element 10 is configured in such a manner that the tolerance for the phase matching conditions (the phase matching bandwidth) with respect to the wavelengths of the fundamental waves and the temperature of the wavelength converting element is enlarged by using a linear chirp structure in which the periods of the polarization inversions increase in proportion to the distance. In other words, according to the present embodiment, by changing the periods of the polarization inversions in the chirp-like manner, variable bandwidths of the fundamental wave laser beams are broadened so that the phase matching conditions are alleviated. According to the present embodiment, the polarization inversion periods of the nonlinear optical material 1 are changed in such a manner that each of the polarization inversion periods has a phase matching bandwidth that includes the phase matching conditions of at least two of the plurality of laser oscillation modes. More specifically, the pitch or the like of the polarization inversion periods of the nonlinear optical material 1 is gradually changed so that it is possible to perform the wavelength conversion on, for example, a fundamental wave that oscillates in a zeroth-order laser oscillation mode (a zeroth-order mode) and a fundamental wave that oscillates in a first-order laser oscillation mode (a first-order mode).

Figure 3:
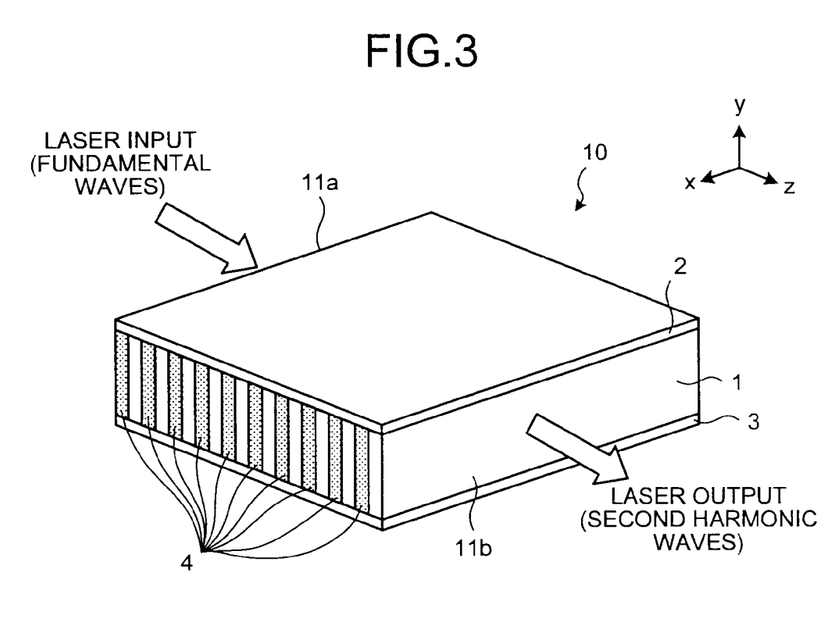
FIG. 3 is a perspective view illustrating a configuration of a wavelength converting element.

FIG. 3 is a perspective view illustrating a configuration of a wavelength converting element. As shown in FIG. 3, the nonlinear optical material 1 included in the wavelength converting element 10 has a plurality of polarization inversion layers 4. The polarization inversion layers 4 are obtained by inverting the direction of the polarization of a single-crystal dielectric material that is polarized in a specific direction. Within the nonlinear optical material 1, non-polarization-inversion regions and polarization-inversion regions (the polarization inversion layers 4) are formed so as to alternate. As a result, the polarization inversion layers 4 are formed periodically within the nonlinear optical material 1. The polarization inversion layers 4 each have a substantially plate-like shape and are sandwiched between the clads 2 and 3 in such a manner that the plate-like main surfaces thereof extend parallel to the x-axis direction and the y-axis direction.

The nonlinear optical material 1 receives a laser input of the fundamental waves (the fundamental wave laser beams) from the laser medium 21 from the end face 11*a* side and allows the fundamental waves to sequentially propagate through the non-polarization-inversion regions and the polarization-inversion regions that are disposed so as to alternate. When the fundamental wave laser beams have become incident onto the nonlinear optical material 1, the nonlinear optical material 1 converts the fundamental wave laser beams into the second harmonic laser beams with a nonlinear effect. In the nonlinear optical material 1, the crystal axis angle, the temperature, and the periods of the inverted polarizations are optimized in advance, so that the fundamental wave laser beams can be converted into the second harmonic laser beams. A part of the fundamental wave laser beams that have become incident onto the nonlinear optical material 1 is thus converted into the second harmonic laser beams and is output, as a laser output, to the outside through the end face 11*b*.

Other fundamental wave laser beams that are remaining in the nonlinear optical material 1 without being converted into the second harmonic laser beams are totally reflected on the end face 11*b* and go through the nonlinear optical material 1 again and are converted into second harmonic laser beams. The second harmonic laser beams that are generated as a result of the conversion of the part of the remaining fundamental laser beams are totally reflected on the end face 11*a* and are output, as a laser output, to the outside through the end face 11*b*.

Figure 4:
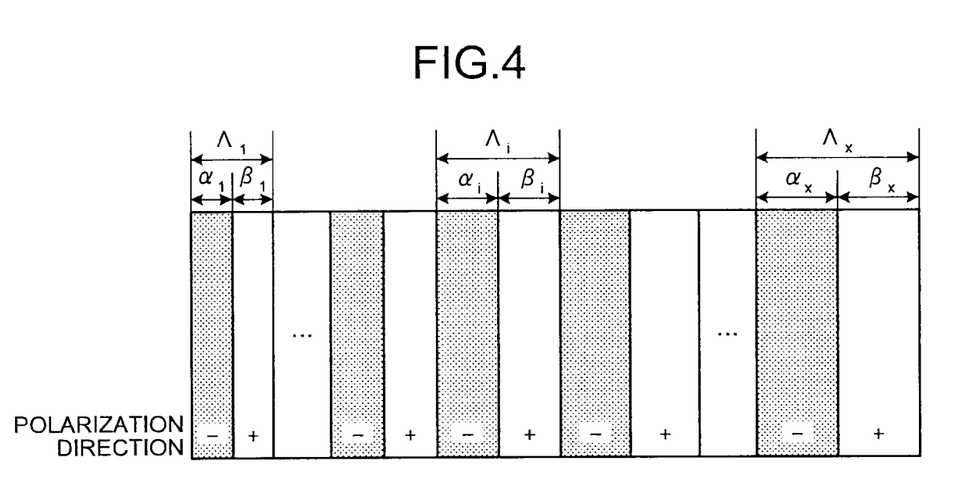
FIG. 4 is a diagram for explaining a polarization inversion pattern of a wavelength converting element.

FIG. 4 is a diagram for explaining a polarization inversion pattern of a wavelength converting element. In FIG. 4, a polarization inversion pattern that is observed when the nonlinear optical material 1 is viewed from the top face thereof (in the y-axis direction) is shown. In the polarization inversion pattern of the nonlinear optical material 1, a plurality of sets are arranged in the z-axis direction, each of the sets being made up of a positive (+) polarized layer (a non-polarization-inversion region) and a negative (−) polarized layer (a polarization inversion layer 4). In other words, the non-polarization-inversion regions and the polarization-inversion regions are arranged so as to alternate in the z-axis direction.

In the nonlinear optical material 1, the polarized layers are arranged according to polarization inversion periods $\Lambda_1$ to $\Lambda_x$ (where X is a natural number), between the end face 11*a* and the end face 11*b*. In other words, in the nonlinear optical material 1, the polarization is periodically inverted along the waveguide direction. For example, the first set of polarized layers that is positioned near the end face 11*a* has a polarization inversion period $\Lambda_1$. Also, an i'th set (where i is any one of natural numbers from 1 to X) of polarized layers has a polarization inversion period $\Lambda_i$. Further, an X'th set of polarized layers that is positioned near the end face 11*b* has a polarization inversion period $\Lambda_x$.

A duty ratio in each of the polarized layers can be expressed as $\alpha_i/\Lambda_i$. Accordingly, duty ratios corresponding to the polarization inversion periods $\Lambda_1$ to $\Lambda_x$ can be expressed as $\alpha_1/\Lambda_1$ to $\alpha_x/\Lambda_x$, respectively. In the nonlinear optical material 1 according to the present embodiment, the period change amount of the chirp period is, for example, $\Delta\Lambda$. In other words, the chirp period is set in the nonlinear optical material 1 while changing the polarization inversion periods $\Lambda_1$ to $\Lambda_x$ in such a manner that $\Lambda_i=\Lambda_1+(i\times\Delta\Lambda)$ is satisfied. As a result, the polarization inversion periods in the nonlinear optical material 1 gradually become longer from the end face onto which the laser beams become incident (the end face 11*a*) toward the end face from which the laser beams are emitted (the end face 11*b*). Alternatively, another arrangement is acceptable in which $\Delta\Lambda$ is configured so as to be a negative value so that the polarization inversion periods gradually become shorter.

Also, yet another arrangement is acceptable in which the duty ratios in the polarized layers are changed. For example, it is acceptable to gradually change the duty ratios in the polarized layers from the end face 11*a* toward the end face 11*b*. It is also acceptable to change the duty ratios only in one or more portions positioned between the end face 11*a* and the end face 11*b*. By changing the polarization inversion periods or the duty ratios, it is possible to efficiently perform the wavelength conversion on the plurality of laser beams having mutually different wavelengths.

Figure 5:
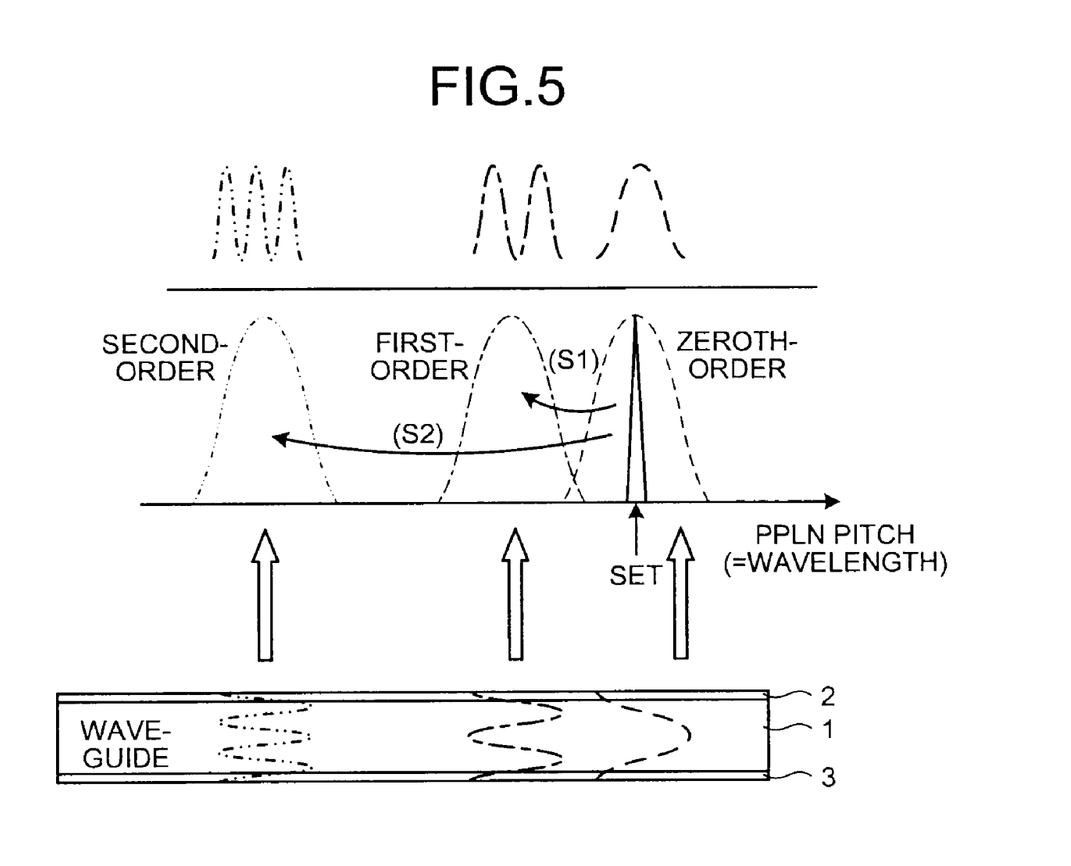
FIG. 5 is a diagram for explaining a transfer of a laser oscillation mode to a high-order mode.

FIG. 5 is a diagram for explaining a transfer of a laser oscillation mode to a high-order mode. When the wavelength converting element 10 performs a wavelength conversion in a phase matching band by converting the wavelength, the loss at a phase matching band peak increases. As a result, in the waveguide (the nonlinear optical material 1), for example, the laser oscillation mode transfers from the zeroth-order mode to the first-order mode (S1), and further, the laser oscillation mode transfers from the first-order mode to the second-order mode (S2), so that the plurality of laser oscillation modes are formed. The temperature of the wavelength converting element that is optimal for the wavelength conversion is different for each of the mutually different laser oscillation modes. Thus, the phase matching condition is also different for each of the mutually different modes. Consequently, the PPLN pitch (the polarization inversion period) is also different for each of the mutually different modes.

Figure 6:
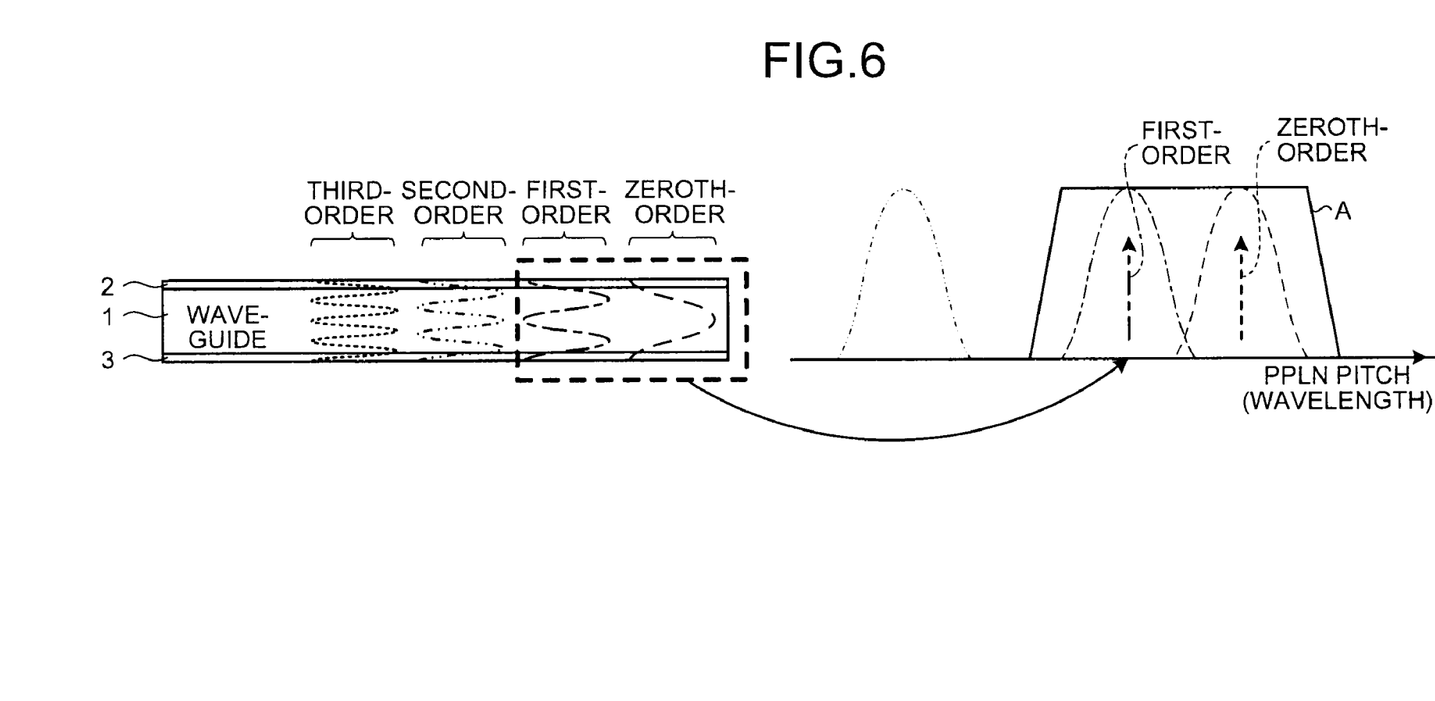
FIG. 6 is a diagram for explaining a process to broaden a phase matching band.

For this reason, according to the present embodiment, the phase matching band of the wavelength converting element 10 is broadened in such a manner that at least two of the laser oscillation modes are included, as shown in FIG. 6. It is easier for an even-number-order laser oscillation mode to be joined with another even-number-order laser oscillation mode, whereas it is easier for an odd-number-order laser oscillation mode to be joined with another odd-number-order laser oscillation mode. Thus, according to the present embodiment, the phase matching band of the wavelength converting element 10 is broadened in such a manner that, for example, an even-number-order laser oscillation mode and an odd-number-order laser oscillation mode are included. More specifically, the polarization inversion periods of the wavelength converting element 10 are changed in a chirp-like manner so that it is possible to perform the wavelength conversion on an even-number-order fundamental wave and an odd-number-order fundamental wave when the fundamental waves oscillate in a high-order mode. In FIG. 6, an example is shown in which a phase matching band A of the wavelength converting element 10 is broadened in such a manner that the zeroth-order mode and the first-order mode are included. As a result, it is possible to perform the wavelength conversion on the fundamental waves while effectively using the power inside the waveguide.

Figure 7:
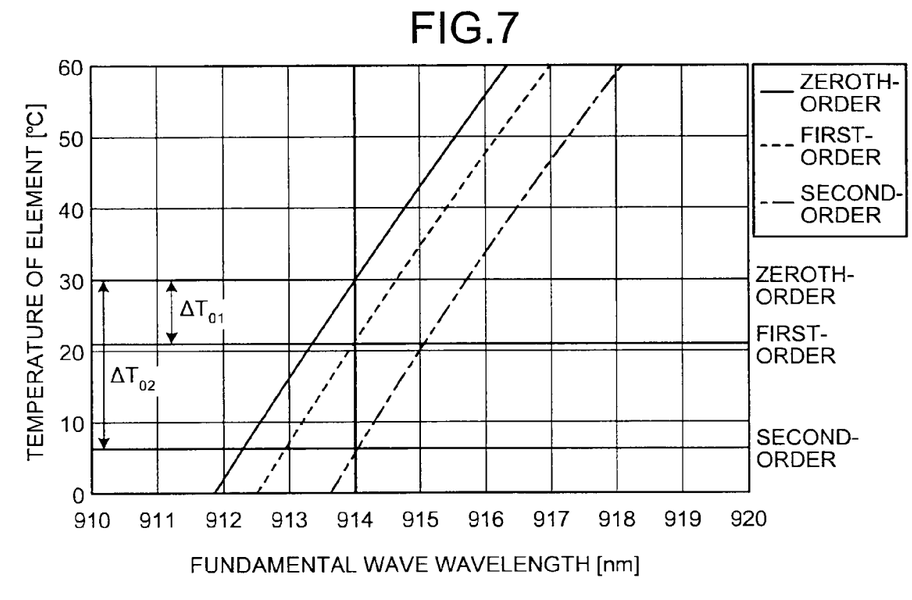
FIG. 7 is a diagram for explaining relationships between fundamental wave wavelengths in respective laser oscillation modes and temperatures of the wavelength converting element.

FIG. 7 is a diagram for explaining relationships between fundamental wave wavelengths in the respective laser oscillation modes and temperatures of the wavelength converting element. In FIG. 7, an example is shown in which the difference in the phase matching condition between the zeroth-order mode and the first-order mode is $\Delta T_{01}$, whereas the difference in the phase matching condition between the zeroth-order mode and the second-order mode is $\Delta T_{02}$. As shown in FIG. 7, the fundamental wave wavelengths in the mutually different modes correspond to the temperatures of the wavelength converting element in a one-to-one correspondence. When the fundamental wave wavelengths in mutually different modes are equal to each other, the temperature of the wavelength converting element serving as a phase matching condition is different for each of the mutually different modes.

Figure 8:
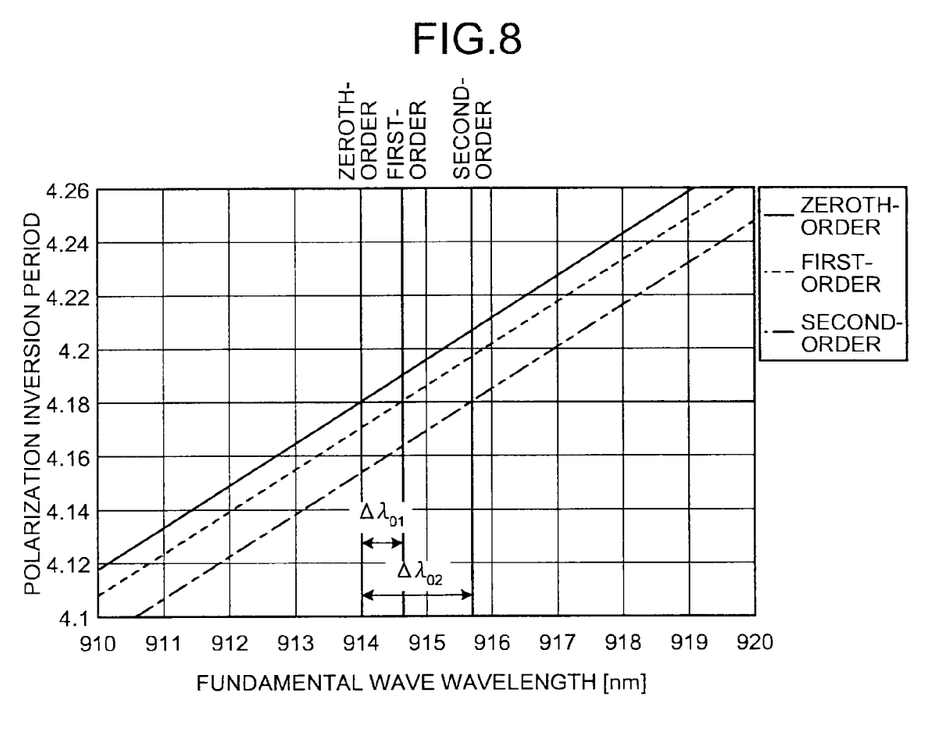
FIG. 8 is a diagram for explaining relationships between fundamental wave wavelengths in respective laser oscillation modes and polarization inversion periods.

FIG. 8 is a diagram for explaining relationships between fundamental wave wavelengths in the respective laser oscillation modes and polarization inversion periods. In FIG. 8, an example is shown in which the difference in the phase matching condition between the zeroth-order mode and the first-order mode is $\Delta\lambda_{01}$, whereas the difference in the phase matching condition between the zeroth-order mode and the second-order mode is $\Delta\lambda_{02}$. As shown in FIG. 8, the fundamental wave wavelengths in the mutually different modes correspond to the polarization inversion periods in a one-to-one correspondence. When the fundamental wave wavelengths in mutually different modes are equal to each other, the difference in the phase matching condition is the difference in the temperature of the wavelength converting element. Thus, the difference in the phase matching condition is represented by a wavelength conversion value based on relationships between the fundamental wave wavelengths in the mutually different laser oscillation modes and the temperatures of the wavelength converting element.

For example, in the case where, as shown in FIG. 7, the fundamental wave wavelength is 914 nanometers (where the polarization inversion period is 4.18), the temperature of the element needs to be 30° C. to perform a wavelength conversion in the zeroth-order mode. In contrast, the temperature of the element needs to be 21° C. to perform a wavelength conversion in the first-order mode. Thus, the difference in the temperature between the zeroth-order mode and the first-order mode, which is expressed as $\Delta T_{01}$, is 9° C. Further, the temperature of the element needs to be 6° C. to perform a wavelength conversion in the second-order mode. Thus, the difference in the temperature between the zeroth-order mode and the second-order mode, which is expressed as $\Delta T_{02}$, is 24° C.

As another example, in the case where, as shown in FIG. 8, the polarization inversion period is 4.18 micrometers (where the temperature of the element is 30° C.), the fundamental wavelength needs to be 914 nanometers to perform a wavelength conversion in the zeroth-order mode. In contrast, the fundamental wavelength needs to be 914.65 nanometers to perform a wavelength conversion in the first-order mode. Thus, the difference in the wavelength between the zeroth-order mode and the first-order mode, which is expressed as $\Delta\lambda_{01}$, is 0.65 nanometers. Further, the fundamental wavelength needs to be 915.75 nanometers to perform a wavelength conversion in the second-order mode. Thus, the difference in the wavelength between the zeroth-order mode and the second-order mode, which is expressed as $\Delta\lambda_{02}$, is 1.75 nanometers. The ratio of the difference in the temperature between the zeroth-order mode and the first-order mode to the difference in the temperature between the zeroth-order mode and the second-order mode is equal to the ratio of the difference in the wavelength between the zeroth-order mode and the first-order mode to the difference in the wavelength between the zeroth-order mode and the second-order mode. Thus, it is possible to convert the difference in the phase matching condition by using the difference in the temperature of the wavelength converting element and the difference in the fundamental wavelength.

Next, calculation formulae for calculating wavelength intervals in two waveguide modes that are formed in the wavelength converting element 10 will be explained. After a method for calculating equivalent refractive indices respectively corresponding to the waveguides and the polarization inversion periods of the wavelength converting element 10 is explained, a method for calculating the wavelength intervals between the mutually different waveguide modes will be explained.

First, the equivalent refractive indices corresponding to the waveguides will be explained. When an equivalent refractive index of a waveguide with respect to a wavelength λ in a Transverse Magnetic (TM) m'th-order mode (where m is a natural number) or a Transverse Electric (TE) m'th-order mode is expressed as N(λ, m), relational expressions shown below (Expressions (1) and (2)) are satisfied. Expressions (1) and (2) represent relational expressions in a situation where the waveguide is a symmetric three-layered plate-like waveguide in which the clad material refractive index of a waveguide upper portion is equal to the clad material refractive index of a waveguide lower portion.

In the TM m'th-order mode:

$$\frac{\pi t}{\lambda}\sqrt{n_1(\lambda)^2 - N(\lambda, m)^2} - \tan^{-1}\left(\frac{n_1(\lambda)^2}{n_2(\lambda)^2} \frac{\sqrt{N(\lambda, m)^2 - n_2(\lambda)^2}}{\sqrt{n_1(\lambda)^2 - N(\lambda, m)^2}}\right) = \frac{m\pi}{2} \quad (1)$$

In the TE m'th-order mode:

$$\frac{\pi t}{\lambda}\sqrt{n_1(\lambda)^2 - N(\lambda, m)^2} - \tan^{-1}\left(\frac{\sqrt{N(\lambda, m)^2 - n_2(\lambda)^2}}{\sqrt{n_1(\lambda)^2 - N(\lambda, m)^2}}\right) = \frac{m\pi}{2} \quad (2)$$

In Expressions (1) and (2), $n_1(\lambda)$ represents a refractive index of a core material (the nonlinear optical material 1) forming the waveguide, with respect to the wavelength λ, whereas $n_2(\lambda)$ represents a refractive index of an upper clad material (the clad 2) and a lower clad material (the clad 3) forming the waveguide, with respect to the wavelength λ. The term N(λ, m) represents an equivalent refractive index with respect to the wavelength λ (where m is the order number of the mode of the waveguide), whereas t represents the thickness of the core forming the waveguide.

Next, the polarization inversion periods of the wavelength converting element 10 will be explained. It is possible to express the polarization inversion period Λ of the waveguide-type wavelength converting element 10 by using a relational expression shown below (Expression (3)), based on the equivalent refractive index N(λ, m) of the waveguide with respect to the fundamental wave laser beams and the second harmonic waves in the m'th-order mode.

$$\Lambda = \frac{\lambda_0}{2(N(\lambda_0, 0) - N(\lambda_0/2, 0))} \quad (3)$$

$$= \frac{\lambda_1}{2(N(\lambda_1, 1) - N(\lambda_1/2, 1))}$$

$$= \ldots$$

$$= \frac{\lambda_m}{2(N(\lambda_m, m) - N(\lambda_m/2, m))}$$

In expression (3), $\lambda_0$ represents the fundamental wavelength in the zeroth-order mode, whereas $\lambda_0/2$ represents the second harmonic wavelength in the zeroth-order mode. Further, $\lambda_1$ represents the fundamental wavelength in the first-order mode, whereas $\lambda_1/2$ represents the second harmonic wavelength in the first-order mode. Similarly, $\lambda_m$ represents the fundamental wavelength in the m'th-order mode, whereas $\lambda_m/2$ represents the second harmonic wavelength in the m'th-order mode.

Next, the wavelength intervals between mutually different waveguide modes will be explained. It is possible to calculate a wavelength interval between mutually different waveguide modes, based on a fundamental wave wavelength in the m'th-order mode that satisfies the equivalent refractive index expressed in Expression (1) and the polarization inversion period expressed in Expression (2). In other words, it is possible to calculate a wavelength interval $\Delta\lambda_{mn}$ between the waveguide m'th-order mode and a waveguide n'th-order mode (where n is a natural number) by using an expression $\Delta\lambda_{mn}=|\lambda_m-\lambda_n|$. For example, it is possible to calculate a wavelength interval $\Delta\lambda_{01}$ between the waveguide zeroth-order mode and the waveguide first-order mode by using an expression $\Delta\lambda_{01}=|\lambda_0-\lambda_1|$. Accordingly, in the case where the polarization inversion period $\Lambda$ satisfies $\Lambda=4.18$ (micrometers), and the fundamental wave wavelength $\lambda_0$ in the zeroth-order mode satisfies $\lambda_0=914$ (nanometers), the wavelength interval $\Delta\lambda_{01}$ between the zeroth-order mode and the first-order mode of the waveguide satisfies $\Delta\lambda_{01}=0.65$ (nanometers).

The relational expression for the polarization inversion periods of the wavelength converting element 10 and the relational expression for the waveguide intervals between the mutually different waveguide modes described above correspond to the chart in FIG. 8 in which the relationships between the fundamental wave wavelengths in the respective laser oscillation modes and the polarization inversion periods are shown.

Next, a calculation formula for calculating wavelength conversion efficiency will be explained. It is possible to calculate wavelength conversion efficiency η by using Expression (4) shown below.

$$\eta = \frac{I_{SH}}{I_F} = \frac{8 \cdot \pi^2 \cdot d_{eff}^2}{n_{SH} \cdot n_F^2 \cdot c \cdot \varepsilon_0 \cdot \lambda^2} \cdot L^2 \cdot I_F \quad (4)$$

In Expression (4), $I_F$ represents a fundamental wave input power, whereas $I_{SH}$ represents a harmonic output power. Further, $d_{eff}$ represents an effective nonlinear optical constant, whereas $n_F$ represents a refractive index with respect to the fundamental wave. In addition, $n_{SH}$ represents a refractive index with respect to the harmonic wave, whereas c represents the speed of light in a vacuum. Further, $\varepsilon_0$ represents the electric permittivity in a vacuum, whereas L represents the length of the element. It should be noted that the effective nonlinear optical constant "$d_{eff}$" varies depending on the chirp period.

As shown in Expression (4), the wavelength conversion efficiency is proportional to the fundamental wave input power, whereas the harmonic output power is proportional to the square of the fundamental wave input power. As a result, if the internal power of a fundamental wave resulting from an internal wavelength conversion is high, it is possible to obtain a harmonic wave having a high power, even if the effective nonlinear optical constant based on the chirp period is small.

According to the present embodiment, the phase matching band of the wavelength converting element 10 is broadened to a desired width, by using the relationships between the fundamental wave wavelengths in the respective laser oscillation modes and the temperatures of the wavelength converting element shown in FIG. 7 and the relationships between the fundamental wave wavelengths in the respective laser oscillation modes and the polarization inversion periods shown in FIG. 8, as well as Expressions (1) to (4). In this situation, the phase matching band is broadened so that the phase matching band has a width that is suitable for the waveguide structure of the wavelength converting element 10. For example, the phase matching band of the wavelength converting element 10 is broadened so as to include the laser oscillation modes that are developed when the wavelength converting element 10 performs the wavelength conversion.

For example, it is acceptable to broaden the phase matching band of the wavelength converting element 10 in such a manner that the zeroth-order mode and the first-order mode are included. Alternatively, it is acceptable to broaden the phase matching band of the wavelength converting element 10 in such a manner that the zeroth-order, the first-order, and the second-order laser oscillation modes are included. Further, it is also acceptable to broaden the phase matching band of the wavelength converting element 10 in such a manner that the third-order and/or higher laser oscillation modes are included.

When the wavelength converting element 10 has the characteristics shown in FIGS. 7 and 8, the polarization inversion period needs to be 4.18 to perform a wavelength conversion on the fundamental wave in the zeroth-order mode, while the polarization inversion period needs to be approximately 4.17 to perform a wavelength conversion on the fundamental wave in the first-order mode. Thus, in this situation, to perform a wavelength conversion on the fundamental wave wavelengths in the zeroth-order and the first-order laser oscillation modes, it is necessary to change the polarization inversion periods from approximately 4.17 to 4.18. In other words, it is necessary to extract a plurality of polarization inversion periods corresponding to the laser oscillation modes in which the wavelength conversion needs to be performed, so that the polarization inversion periods of the wavelength converting element 10 are changed in such a manner that the extracted polarization inversion periods are included.

Figure 9:
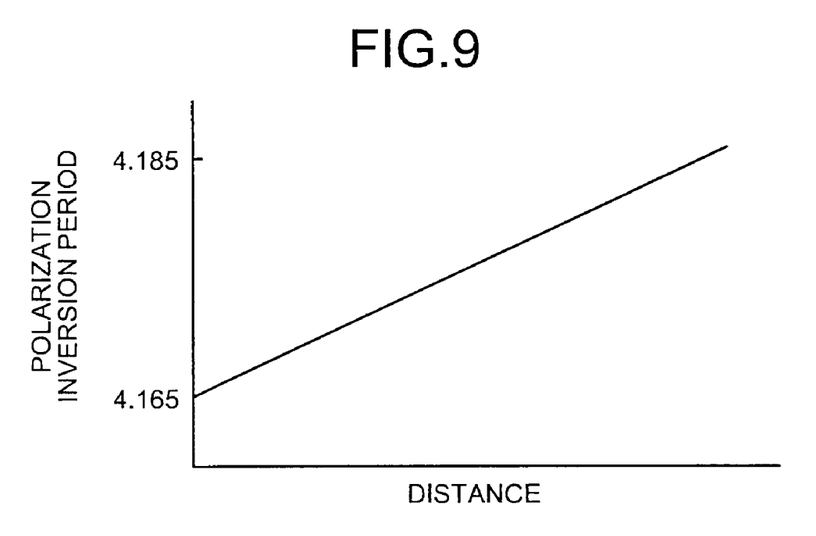
FIG. 9 is a diagram illustrating an example of a polarization inversion period when a wavelength conversion is performed on fundamental wave wavelengths in a zeroth-order mode and a first-order mode.

FIG. 9 is a diagram illustrating an example of a polarization inversion period when a wavelength conversion is performed on the fundamental wave wavelengths in the zeroth-order mode and the first-order mode. In FIG. 9, the vertical axis represents the polarization inversion period (the PPLN pitch), whereas the horizontal axis represents the distance in the z-axis direction within the wavelength converting element 10

(the distance from the end face 11*a*). As shown in FIG. 9, in the case where the wavelength converting element 10 performs a wavelength conversion on the fundamental wavelengths in the zeroth-order mode and the first-order mode, the polarization inversion period is increased from the end face 11*a* to the end face 11*b*, according to a predetermined rate of increase. In this situation, the polarization inversion period of the wavelength converting element 10 is increased in such a manner that the polarization inversion period corresponding to the zeroth-order mode (4.18) and the polarization inversion period corresponding to the first-order mode (4.17) are included.

Figure 10:
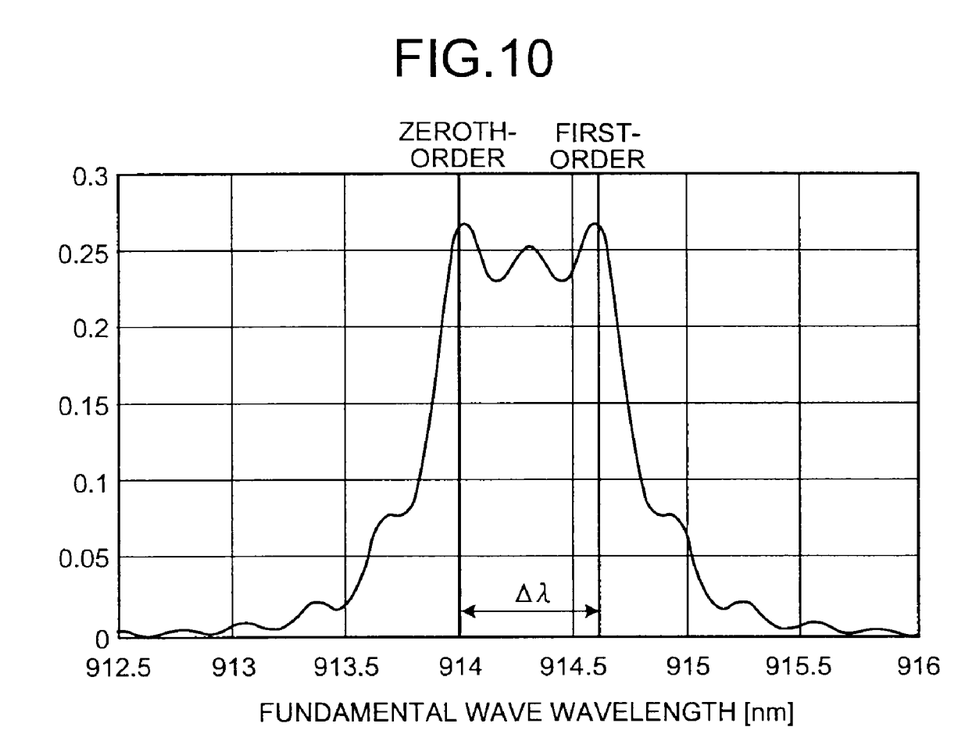
FIG. 10 is a diagram illustrating a wavelength conversion efficiency in a situation where a wavelength conversion is performed in a plurality of modes while using the polarization inversion period shown in FIG. 9.

FIG. 10 is a diagram illustrating a wavelength conversion efficiency in a situation where a wavelength conversion is performed in a plurality of modes while using the polarization inversion period shown in FIG. 9. In FIG. 10, an example is shown in which the intra-mode wavelength width between the wavelength of the fundamental wave that oscillates in the zeroth-order mode and the wavelength of the fundamental wave that oscillates in the first-order mode is expressed as $\Delta\lambda$. By changing the polarization inversion period of the wavelength converting element 10 from 4.165 to 4.185 so that 4.17 and 4.18 are included, it is possible to efficiently perform the wavelength conversion on both the wavelength of the fundamental wave that oscillates in the zeroth-order mode and the wavelength of the fundamental wave that oscillates in the first-order mode. As a result, the wavelength conversion efficiency is higher in the situation where the wavelength conversion is performed on the wavelengths of the fundamental waves that oscillate in the zeroth-order and the first-order laser oscillation modes than in the situation where a wavelength conversion is performed on the wavelength of the fundamental wave that oscillates in the zeroth-order mode.

Figure 11:
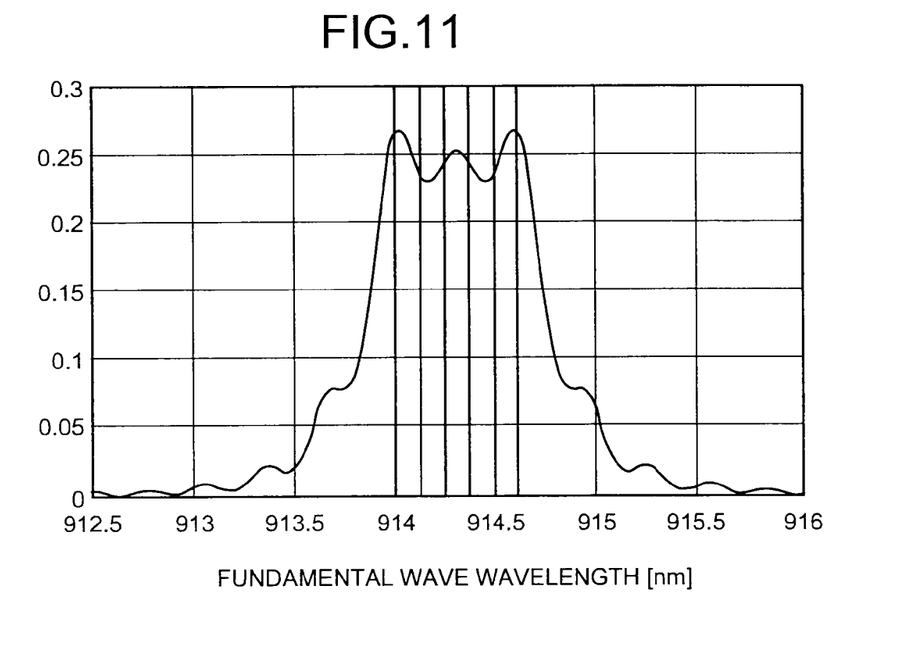
FIG. 11 is a diagram illustrating a wavelength conversion efficiency in a situation where a wavelength conversion is performed for a multi-wavelength oscillation while using the polarization inversion period shown in FIG. 9.

The wavelength converting laser apparatus 100 is able to perform a wavelength conversion not only on fundamental waves in a plurality of laser oscillation modes but also on fundamental waves in a multi-wavelength oscillation (in which the laser oscillates at a plurality of wavelengths). FIG. 11 is a diagram illustrating a wavelength conversion efficiency in a situation where a wavelength conversion is performed for a multi-wavelength oscillation while using the polarization inversion period shown in FIG. 9. As shown in FIG. 11, when the polarization inversion period of the wavelength converting element 10 is changed from 4.165 to 4.185, it is possible to efficiently perform a wavelength conversion on all of the fundamental wave wavelengths resulting from the multi-wavelength oscillation at 914 nanometers to 914.6 nanometers. Consequently, the wavelength conversion efficiency is higher in the situation where the wavelength conversion is performed on the plurality of fundamental wave wavelengths than in the situation where a wavelength conversion is performed only on a single fundamental wave wavelength.

Next, to make the difference clear between the wavelength conversion efficiency of the wavelength converting element 10 according to the present embodiment and the wavelength conversion efficiency of conventional wavelength converting elements, the wavelength conversion efficiency of a conventional wavelength converting element will be explained.

Figure 12:
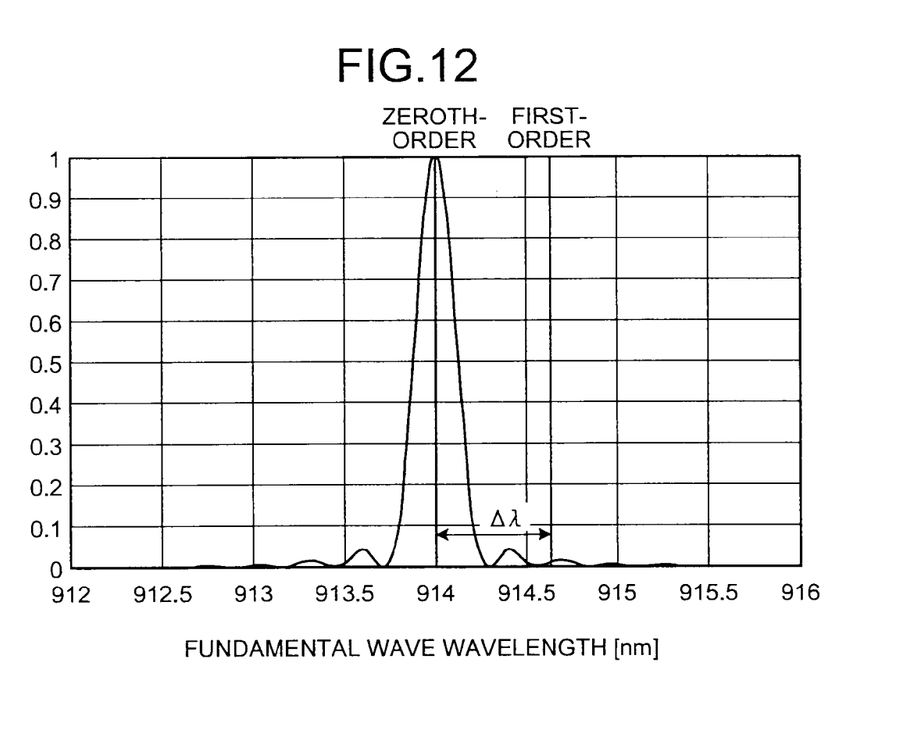
FIG. 12 is a diagram illustrating a wavelength conversion efficiency of a conventional wavelength converting element.

FIG. 12 is a diagram illustrating the wavelength conversion efficiency of a conventional wavelength converting element. As shown in FIG. 12, the conventional wavelength converting element performs a wavelength conversion only on the wavelength of a fundamental wave that oscillates in the zeroth-order mode. Thus, it is not possible to efficiently perform a wavelength conversion on the wavelength of the fundamental wave that oscillates in the first-order mode. As a result, the conventional wavelength converting element is not able to efficiently perform the wavelength conversion on all the fundamental wavelengths that are generated in the wavelength converting element.

In contrast, the wavelength converting element 10 according to the present embodiment is able to perform a wavelength conversion on the fundamental waves in the plurality of modes. Thus, it is possible to efficiently perform the wavelength conversion on the fundamental waves in the plurality of modes that are developed in the wavelength converting element 10. Consequently, even in the situation where the wavelength converting laser apparatus 100 performs a multi-emitter oscillation, it is possible to inhibit decreases in the oscillation efficiency of the fundamental waves. Also, even if the thickness of the wavelength converting element 10 in the y-axis direction is large, it is possible to efficiently perform the wavelength conversion on the fundamental waves in the plurality of modes. Thus, it is possible to manufacture the wavelength converting element 10 easily.

In the description of the present embodiment, the examples in which the wavelength converting laser apparatus 100 is configured as shown in FIGS. 1 and 2 have been explained. However, the wavelength converting laser apparatus 100 does not necessarily have to be configured as shown in FIGS. 1 and 2. For example, another arrangement is acceptable in which the wavelength converting element 10 includes only one of the clads 2 and 3. Yet another arrangement is acceptable in which the solid laser element 20 includes only one of the clads 22 and 23. Further, yet another arrangement is acceptable in which a substrate is provided on the outside of the clads 2 and 3 or together with the clads 22 and 23. Further, the wavelength converting laser apparatus 100 does not necessarily have to use an internal wavelength converting method (a wavelength converting element is installed on the inside of a resonator). The wavelength converting laser apparatus 100 may use an external wavelength converting method (a wavelength converting element is installed on the outside of a resonator). In the case where the wavelength converting laser apparatus 100 uses the internal wavelength converting method, the fundamental wave laser beams oscillate between the end face 25*a* of the solid laser element 20 and the end face 11*b* of the wavelength converting element 10. Alternatively, in the case where the wavelength converting laser apparatus 100 uses the external wavelength converting method, the fundamental wave laser beams oscillate between the end face 25*a* of the solid laser element 20 and the end face 25*b* of the solid laser element 20.

Figure 13:
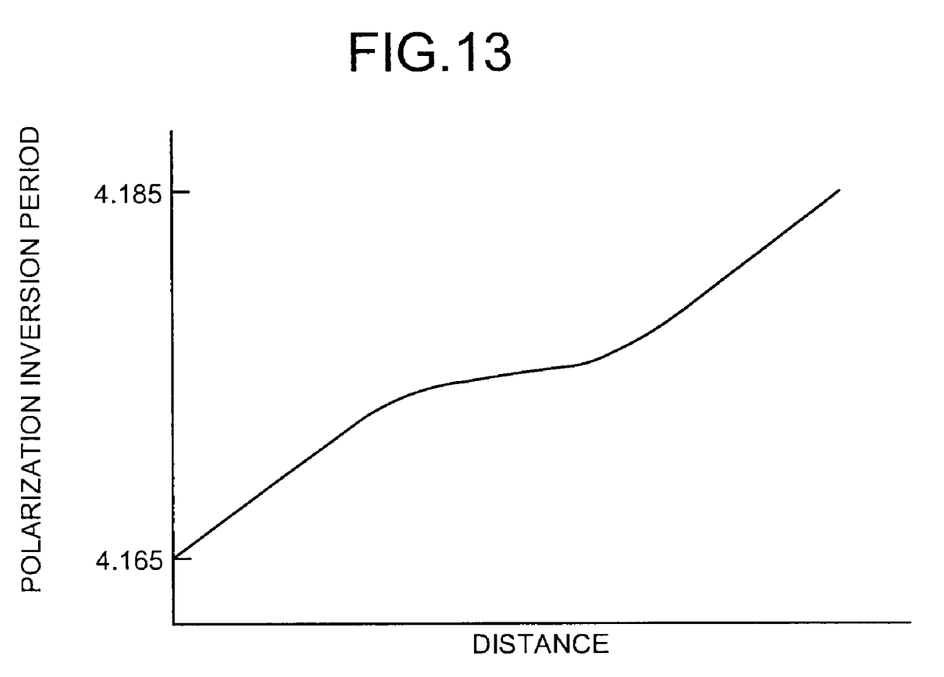
FIG. 13 is a diagram illustrating an example of a polarization inversion period in a situation where the polarization inversion period is changed in the manner of a curve.

Furthermore, in the description of the present embodiment, the example in which the polarization inversion period of the wavelength converting element 10 is changed in the manner as shown in FIG. 9 has been explained. However, it is acceptable to change the polarization inversion period in a manner other than the one shown in F*ig*. 9. For example, it is acceptable to change the polarization inversion period of the wavelength converting element 10 in the manner of a curve, as shown in FIG. 13.

In the description of the present embodiment, the example in which the phase matching band of the wavelength converting element 10 is broadened in such a manner that an even-number-order laser oscillation mode and an odd-number-order laser oscillation mode are included has been explained. However, another arrangement is acceptable in which the phase matching band of the wavelength converting element 10 is broadened in such a manner that it is possible to perform a conversion process on desired fundamental waves of the zeroth-order to the m'th-order.

As explained above, according to the present embodiment, the phase matching band of the wavelength converting element 10 is broadened by gradually changing the pitch or the like of the polarization inversion periods, so that it is possible to perform the wavelength conversion on the fundamental waves that oscillate in the plurality of laser oscillation modes. Thus, it is possible to perform the wavelength conversion for the plurality of mutually different modes of the fundamental waves (or for the mutually different phase matching temperatures in the case where the fundamental wave wavelengths in the mutually different modes are equal to each other). As a result, it is possible to efficiently perform the wavelength conversion on the fundamental wave wavelengths by using the simple configuration.

Further, according to the present embodiment, the phase matching band of the wavelength converting element 10 is broadened in such a manner that the laser oscillation modes that are the targets of the wavelength conversion include an odd-number-order laser oscillation mode and an even-number-order laser oscillation mode. Thus, it is possible to efficiently perform the wavelength conversion on the fundamental wave wavelengths by using the simple configuration. Furthermore, according to the present embodiment, the phase matching band of the wavelength converting element 10 is broadened in such a manner that the laser oscillation modes that are the targets of the wavelength conversion include the zeroth-order mode and the first-order mode. Thus, it is possible to efficiently perform the wavelength conversion on the fundamental wave wavelengths by using the simple configuration. In addition, because the wavelength conversion is performed on the fundamental waves on the inside of the resonator, it is possible to perform the wavelength conversion on the fundamental wave wavelengths more efficiently than in the case where the wavelength conversion is performed on the fundamental waves on the outside of the resonator.

INDUSTRIAL APPLICABILITY

As explained above, the wavelength converting element and the wavelength converting laser apparatus according to the present invention are useful in a wavelength conversion performed on laser beams in a planar waveguide.

The invention claimed is:

1. A wavelength converting element that is of a planar waveguide type, includes a plate-like nonlinear optical material, and performs a wavelength conversion on a fundamental wave of a laser beam generated by a waveguide type laser element by propagating the fundamental wave in a plurality of laser oscillation modes in a direction perpendicular to a main surface of the plate-like nonlinear optical material, the direction being perpendicular to an optical axis, wherein periods of polarization inversions of the nonlinear optical material are changed in width so that the periods have a phase matching bandwidth that includes phase matching conditions of at least two of the plurality of laser oscillation modes and so that a non-polarization-inversion region and a polarization inversion region are formed in the nonlinear optical material.

2. The wavelength converting element according to claim 1, wherein the at least two of the plurality of laser oscillation modes include an odd-number-order laser oscillation mode and an even-number-order laser oscillation mode.

3. The wavelength converting element according to claim 2, wherein the at least two of the plurality of laser oscillation modes are a zeroth-order mode and a first-order mode.

4. The wavelength converting element according to claim 1, wherein the wavelength conversion of the fundamental wave is performed within a resonator that oscillates the fundamental wave of the laser beam.

5. A wavelength converting laser apparatus comprising:
a waveguide-type solid laser element that oscillates a fundamental wave laser beam; and
a wavelength converting element that is of a planar waveguide type, includes a plate-like nonlinear optical material, and performs a wavelength conversion on a fundamental wave of a laser beam by propagating the fundamental wave in a plurality of laser oscillation modes in a direction perpendicular to a main surface of the plate-like nonlinear optical material, the direction being perpendicular to an optical axis, wherein
periods of polarization inversions of the nonlinear optical material are changed in width so that the periods have a phase matching bandwidth that includes phase matching conditions of at least two of the plurality of laser oscillation modes and so that a non-polarization-inversion region and a polarization inversion region are formed in the nonlinear optical material.

6. The wavelength converting element according to claim 2, wherein the wavelength conversion of the fundamental wave is performed within a resonator that oscillates the fundamental wave of the laser beam.

7. The wavelength converting element according to claim 3, wherein the wavelength conversion of the fundamental wave is performed within a resonator that oscillates the fundamental wave of the laser beam.

* * * * *